United States Patent [19]

Cooksey

[11] Patent Number: 4,821,775

[45] Date of Patent: Apr. 18, 1989

[54] ONE SHOT VALVE

[76] Inventor: George E. Cooksey, 1522 Autumn Ave., Ridgecrest, Calif. 93555

[21] Appl. No.: 252,963

[22] Filed: Oct. 3, 1988

[51] Int. Cl.$^4$ .............................................. F16K 13/00
[52] U.S. Cl. ..................................... 137/68.2; 137/67
[58] Field of Search ......................... 137/67, 68.1, 68.2

[56] References Cited

U.S. PATENT DOCUMENTS

| 3,093,151 | 6/1963 | Merkowitz | 137/68 |
| 3,125,108 | 3/1964 | Murphy | 137/68 |
| 3,332,432 | 7/1967 | Marsh | 137/68 |
| 3,827,449 | 8/1974 | Gurizzan et al. | 137/68 |
| 3,966,226 | 6/1976 | Roth | 280/737 |
| 4,140,041 | 2/1979 | Frelan | 137/68.2 X |
| 4,215,749 | 8/1980 | Dare et al. | 166/361 |
| 4,421,005 | 12/1983 | Byrne | 137/68.2 X |
| 4,542,761 | 9/1985 | Scott | 137/68 A |
| 4,570,658 | 2/1986 | Dean et al. | 137/68.2 |

FOREIGN PATENT DOCUMENTS 909393 2/1982 U.S.S.R. .............................. 137/68.2

Primary Examiner—A. Michael Chambers
Assistant Examiner—John C. Fox
Attorney, Agent, or Firm—William C. Townsend; Melvin J. Sliwka; Stephen J. Church

[57] ABSTRACT

A one-shot, three-way valve having an internal tube forming a zero-leakage fluid path prior to actuation of the valve and having a ram moveable to an actuated position where the tube is cut in two. The ram has a passageway mating in the actuated position with one portion of the cut tube to establish another fluid path. The ram is configured so that, in its actuated position, the other tube portion is pinched by the ram to both close off this other portion and wedge the ram in the actuated position. The valve is adapted for actuation by a pyrotechnic squib and for reuse by convenient replacement of the tube.

10 Claims, 2 Drawing Sheets

ONE SHOT VALVE

BACKGROUND OF THE INVENTION

1. Field of the Invention

The present invention relates to fluid handling. More particularly, it relates to valves with explosive actuation and with fluid control by a destructible or deformable element which retains pressure.

2. Description of the Prior Art

Certain devices for a one-shot function, such as missile fin extension or automobile air bag inflation, use a source of stored, cold gas, typically at 4000 to 5000 psi. The device is pressurized from the source through a valve which is actuated at an appropriate time after a storage period which is, typically, long and indefinite so that the valve must have substantially no leakage before actuation in order that sufficient pressure remains in the source at such time. When the valve is actuated, typically by a pyrotechnic squib, leakage from the valve must be minimal so that the device remains pressurized during its operation, and the valve must remain in its actuated configuration despite large acceleration forces often associated with such one-shot functions.

Prior art valves using O-rings are not suited for such a function since they leak excessively. Certain other prior art valves of normally open construction achieve "zero-leakage" prior to actuation by using a tube extending through the valve to contain the pressurized gas, the tube being severed to close the valve on actuation thereof. After severing the tube, one portion thereof may be pinched off to prevent leakage from the one portion. Alternatively, leakage from both portions may be prevented by wedging the severing element therebetween. Similarly, certain prior art, zero-leakage, normally-closed valves retain pressurized gas by a closed tube end which is severed to open the valve. These prior art zero-leakage valves thus effectively eliminate leakage before they are actuated. However, they are they are deficient in one or more ways, as by excessive leakage after actuation, by not being positively retained in their actuated configuration, or by being inconvenient and expensive to reuse. A particular deficiency is that a single such prior art zero-leakage valve is not adapted to three-way operation. This last deficiency may be avoided by the use of several valves; however, the additional bulk, weight, and expense of several valves is highly disadvantageous in many applications of one-shot valves for high pressure, zero-leakage operation.

SUMMARY OF THE INVENTION

A one-shot, three-way valve having an internal tube, which extends across a cylinder and forms a zero-leakage fluid path prior to actuation of the valve, and having a ram sliding in the cylinder and, typically, motivated by gas from a pyrotechnic squib to move to an actuated position and cut the tube in two. The ram has a passageway which, in this actuated position, mates with one portion of the cut tube to establish another fluid path. The ram is configured so that, as it moves to the actuated position, the other tube portion is pinched between the ram and the cylinder to both close off such other portion and wedge the ram in its actuated position. The valve has fittings replaceably connecting the opposite ends of the tube to the cylinder.

It is an object of the present invention to provide a three-way one shot valve having substantially zero leakage before actuation.

Another object is to provide such a valve which, after actuation, has minimal leakage and has its moveable valving elements positively retained in their actuated positions.

A further object is to provide such a valve which may be inexpensively and conveniently reused, is adapted to actuation by a pyrotechnic squib, and is of economical and rugged construction.

BRIEF DESCRIPTION OF THE DRAWINGS

Other, objects, advantages, and novel features of the present invention will be apparent from the following detailed description when considered with the accompanying drawings wherein.

DETAILED DESCRIPTION

Figure 1:
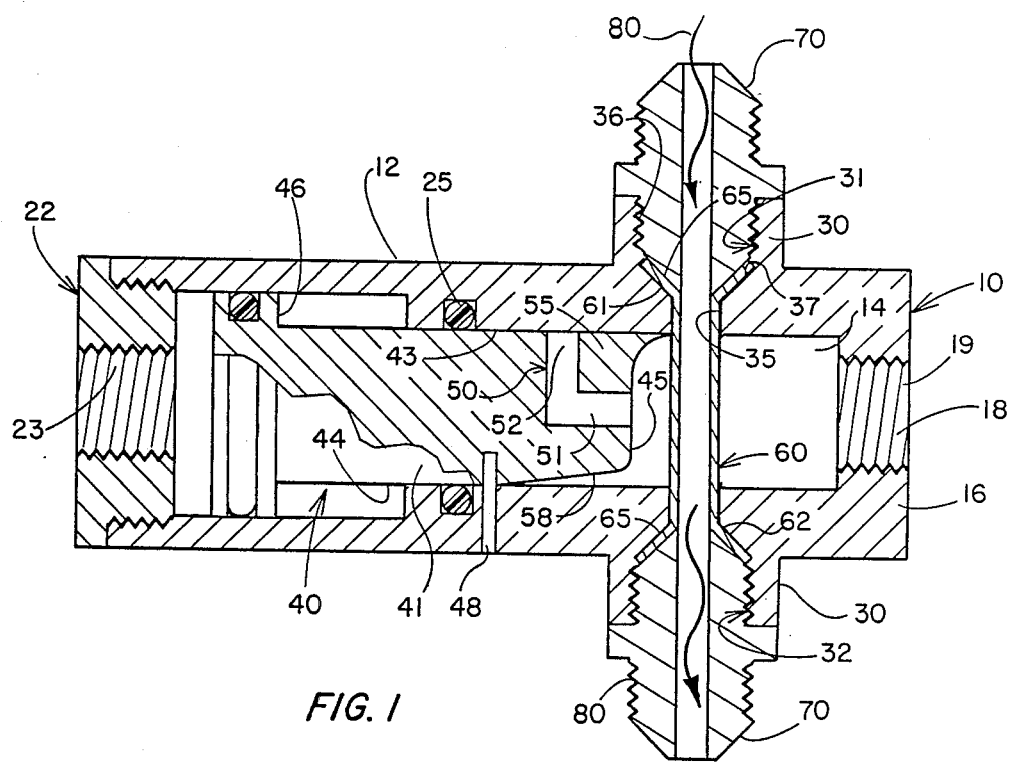
FIG. 1 is an axial section of a one-shot, three way valve which embodies the principles of the invention and has its elements in an unactuated position.

The Figures show a one-shot, three way valve embodying the principles of the present invention. The valve includes a housing 10 having a cylindrically tubular wall 12 defining a cylindrical valve chamber 14. Housing 10 includes a disk-like wall 16 generally closing one end of chamber 14 and having a central opening or first port 18 of the valve. Port 18 opens through wall 16 into chamber 14 and has internal screw-threads 19 for connecting this port to a pressurized fluid conduit, not shown but sometimes referred to in the claims as a "third conduit, for pressurized fluid." The other end of chamber 16 is generally closed by a plug 22 which, typically, is screw-threadably engaged with wall 12 and has a port 23 for admission of hot gas from a pyrotechnic squib, not shown. Housing 10 is depicted in a representative configuration in which chamber 16 is of stepped configuration with a larger diameter portion adjacent plug 22 and a smaller diameter portion adjacent to wall 16, the housing having an annular, O-ring receiving groove 25 in the latter portion near its junction with the larger portion.

Housing 10 has pair of bosses 30 extended outwardly of wall 12 at locations thereon diametrically opposite of chamber 14 toward the end thereof at wall 16. Housing 10 has an opening, bore, or second port 31 of the valve at one boss 30, the upper boss in the Figures, and has another opening, bore, or third port 32 of the valve at the other boss. Ports 31 and 32 are coaxial and open through their respective bosses 30 and through wall 12. Each port 31 or 32 has a smaller diameter cylindrical section or conduit opening 35 adjacent to chamber 14 and has a larger diameter, internally screw-threaded section 36 at the end of the corresponding boss 30. As indicated for port 31 in FIG. 1, each port 31 or 32 is adapted for use in a well-known flared tubing sealing arrangement by having a concave frustoconical section 37 interconnecting portions 35 and 36.

Figure 2:
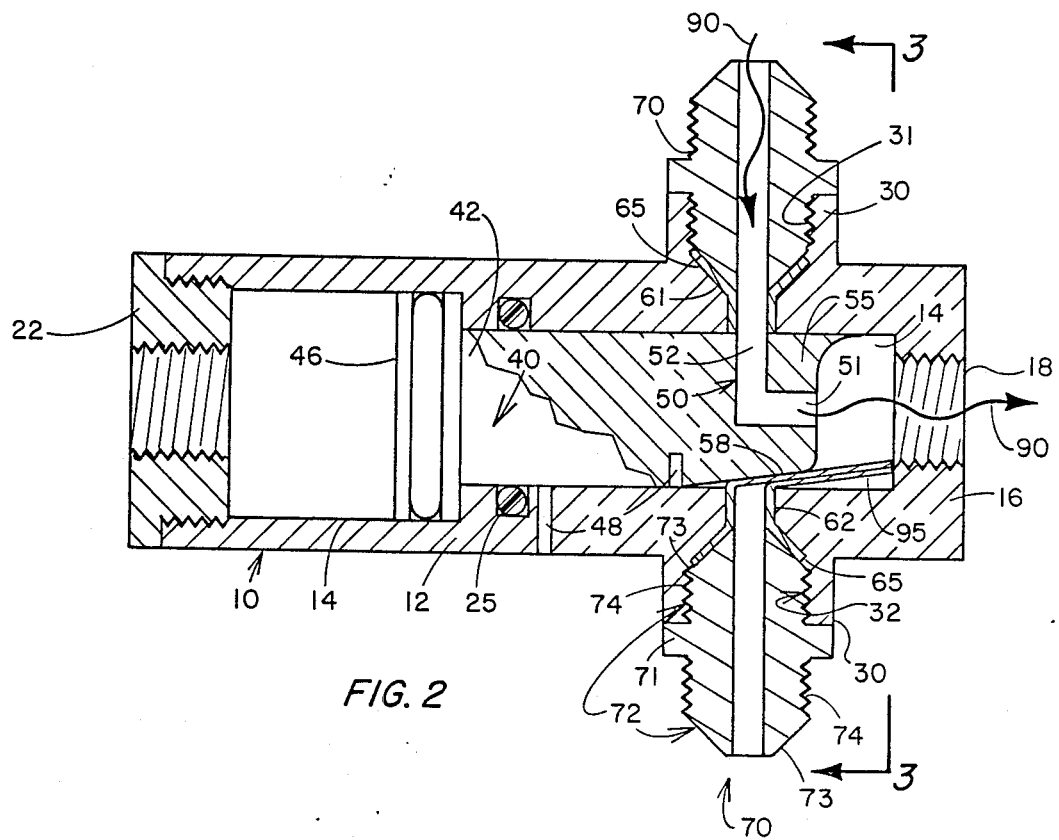
FIG. 2 is a section similar to FIG. 1 with the elements in an actuated position.

The valve has a ram 40 which is externally cylindrical and is slidably fitted in chamber 14 for movement of the ram axially therein, in a direction from plug 22 to disk-like wall 16, from a first or unactuated position 41 of the ram, shown in FIG. 1, to a second or actuated position 42 in which the ram is depicted in FIG. 2. As identified in FIG. 1, ram 40 has first side 43 facing second port 31, has a second side 44 facing third port 32, has a first or operating end 45 disposed toward wall 16 and first port 18, and has a second or piston end 46 disposed toward plug 22. Piston end 46 is fitted in the larger diameter portion of chamber 14 and is circumscribed by an O-ring so that pressurized gas introduced through port 23 into chamber 14 acts on piston end 44 to motivate ram 40 from its position 41 toward its position 42. The valve has a shear pin 48 extending radially of wall 12 and ram 40 through bores individual thereto and aligned in the unactuated position 41. Pin 48 retains ram 40 in position 41 with sides 43 and 44 disposed as just described until gas pressure against end 46 is sufficient to shear the pin 48 and drive ram 40 to its position 42.

Ram 40 defines an L-shaped fluid passage 50 having a first opening 51, which opens through ram end 45 into the chamber 14 portion at wall 16, and having a port or second opening 52 through first ram side 43. Opening 52 is disposed axially of ram 40 so as to be aligned transversely thereof with second port 31 in housing 10 when ram 40 is in its actuated position 42. Ram 40 has on its end 45 a unitary cutting portion or cutter 55 which extends along tubular wall 12 axially of the ram from its side 43 and terminates in an edge 56. Edge 56 is juxtapositioned to section 35 of port 31 at the side thereof opposite wall 16 when the ram is in its unactuated position 41. Ram 40 bears on its side 44 a planar collapsing, crimping, and wedging surface 58 extending axially of chamber 14 from ram end 45 in a direction opposite to chamber end wall 16. Surface 58 is inclined to the axis of chamber 14 so that the end of surface 58 at ram end 45 is spaced from wall 16 a predetermined distance which is greater than the distance surface 58 is spaced from wall 16 remotely from ram end 45. Surface 58 thus diverges from wall 12 in the direction of movement of ram 40 from position 41 to position 42.

Figure 3:
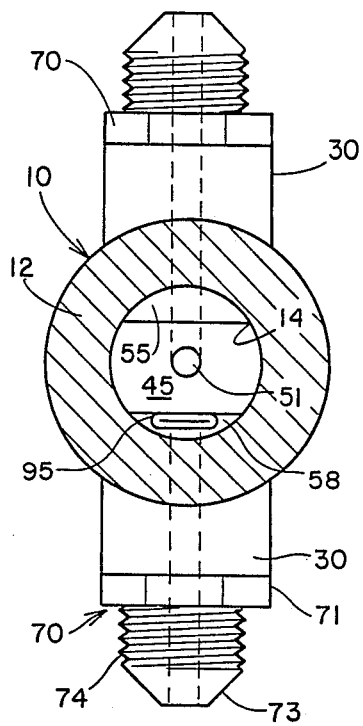
FIG. 3 is a transverse section of the valve on line 3—3 of FIG. 2.

As best shown in FIG. 1, the subject valve has a conduit or tube 60 extending through ports 31 and 32 and extending transversely across chamber 14 coaxially of these ports when ram 40 is in its unactuated position 41. Tube 60 is cylindrical and has a first end portion 61 and an opposite second end portion 62 disposed oppositely of chamber 14. Tube 60 is constructed of any suitable material resulting in the tube being sufficiently severable, flexible, and collapsible to permit certain deformations of the tube from an initial tubular configuration shown in FIG. 1 to another and subsequently described configuration shown in FIG. 2. Tube portions 61 and 62 are received, respectively, in ports 31 and 32 at sections 35 thereof, sections 35 being slightly larger in diameter than tube 60 so that the tube is slidably extendable through wall 12 at each port section 35. Each tube end portion 61 or 62 terminates outwardly of wall 12 in a flared, frustoconical region 65 conforming to and disposed in mating relation with the corresponding frustoconical section 37 of housing 10. It is apparent that each surface 37 is radially outward of tube 60 and that each screwthreaded section 36 of housing 10 is axially outward of the tube. It is also apparent that flared regions 65 are individual to tube portions 61 and 62 and may be considered to be annular compression elements externally larger in diameter than port sections 35 and disposed thereat about the corresponding tube end portion 61 or 62., The valve is provided with a pair of well-known flared tubing fittings 70 individually received in ports 31 and 32. As indicated in FIGS. 2 and 3, each fitting 70 has a central hexagonal region 71 from which extend oppositely a pair of male flared fitting elements 72 each terminating in a convex frustoconical end 73, which conforms to a flared region 65 of tube 60 and to frustoconical housing sections 37, and having external screwthreads 74 which extend between region 71 and end 73 and are constructed to engage a screw-threaded section 36 of a port 31 or 32. At each fitting 70, one element 72 has its screw-threads 74 so engaged so that turning the fitting urges the end 73 into compressive sealing relation with the corresponding flared region 65 and urges this region into compressive sealing relation with the corresponding housing section 37. Each fitting 70 thus serves to fix the corresponding tube end portion 61 or 62 to wall 12 in pressure sealed relation thereto, this relation being established at the corresponding port 31 or 32. The other element 72 of each fitting 70 projects from the corresponding boss 30 and serves to connect in communicating relation to the corresponding tube end portion 65 any suitable conduit, not shown, for pressurized fluid, a first such conduit being attached to port 31 and a second such conduit being attached to port 32.

OPERATION

The operation of the described valve embodying the present invention is believed clearly apparent and will now be briefly described beginning with reference to FIG. 1 in which ram 40 is in its unactuated position 41. In this position, ram 40 is disposed between tube 60 and plug 22 with ram end 45 adjacent to the tube, and the tube is intact so that a first conduit attached to the fitting 70 at port 31 communicates, as indicated by arrows 80, through the tube with a second conduit attached to the fitting 70 at port 32.

Figure 4:
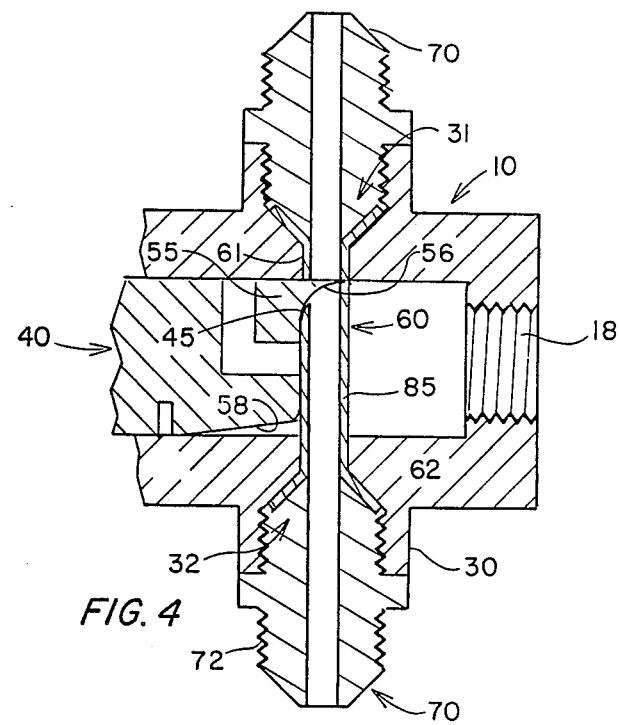
FIG. 4 is fragmentary axial section of the valve showing certain elements thereof as they initially move from the unactuated position.

In FIG. 4, ram 40 is depicted in a position relative to housing 10 in which the ram has moved somewhat toward its position 42 from its position 41 and cutter 55 has severed tube 60 at wall 12 and adjacent to port 31 leaving a portion 85 of tube 60 extending toward port 31 from port 32 and still connected at port 32 by the corresponding fitting 70 to any pressurized fluid conduit, hot shown, connected to element 72 and projecting from the corresponding boss 30.

In the position of ram 40 shown in FIG. 4 ram end 41 and crimping surface 58 are about to engage tube portion 85 as the ram continues to move toward its position 42 shown in FIG. 2 wherein end 51 of passage 50 aligns in communicating relation with port 31 since tube 60 has been previously severed at port 31 as shown in FIG. 4. Referring now to FIG. 3, it is seen that, in position 41, ram end 45 is disposed axially of chamber 14 between both of the ports 31 and 32 and the disk-like wall 16 with passage end 51 aligned with port 31 as just stated so that port 32 communicates with port 18 through passage 50 and end 52 thereof as indicated by arrows 90.

As ram 40 moves from its position shown in FIG. 4 and engages tube portion 85 after its severing by cutter 55, portion 85 is bent by ram end 45 in the direction of ram movement and crimped by ram surface 58 into a collapsed configuration 95, shown in FIGS. 2 and 3, against wall 12 in the region thereof adjacent to port 32. When tube 60 is collapsed into its configuration 95, it effectively seals port 32 from chamber 14 and prevents flow into the subject valve from any conduit attached to the fitting 70 of this port. Also, as ram 40 is motivated by gas pressure on its piston end 46 to move from its FIG. 4 position relative to housing 10 to its position 42, surface 58 overrides tube portion 85 and, as this portion approaches its collapsed configuration 95, wedges the tube portion between surface 58 and wall 12 so as to retain ram 40 in its actuated position 42.

Figure 5:
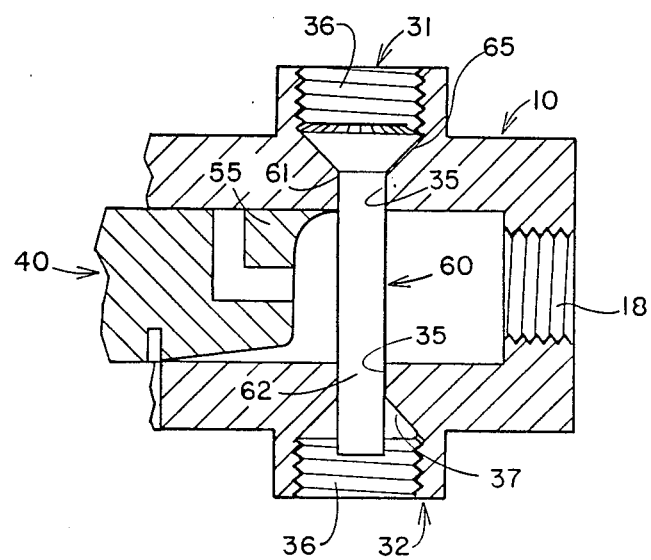
FIG. 5 is a section similar to that of FIG. 4 showing the valve with certain elements removed for installation of a tube.

If it is desired to reuse the subject valve for another one-shot operation, this may be done with relative convenience by unscrewing fittings 70 and driving ram 40 from its position 42 back to its position 41 in any suitable manner, as by a tool inserted through port 18. The severed portions of tube 60 may then be removed from ports 31 and 32. An unsevered tube 60, on which only one flanged region 65 is formed, may then be inserted through port 31 and into port 32 as shown in FIG. 5. It will be apparent that another flanged region may then be formed on the tube portion in port 32; the fittings 70 reinstalled; and a new shear pin 48 provided to restore the valve to its condition shown in FIG. 1.

Obviously many modifications and variations of the present invention are possible in view of the above teachings. It is, therefore, to be understood that, within the scope of the appended claims, the present invention may be practiced other than as specifically described above.

What is claimed is:

1. A three-way one-shot valve comprising; wall means for defining a chamber having opposite ends, said wall means including first closure means at one of said ends and second closure means at the other thereof, said first closure means defining a first port which opens through the first closure means into the chamber;
   a severable and collapsible conduit extending transversely across the chamber and having opposite conduit end portions disposed oppositely of the chamber at said wall means and extended through the wall means so as to define a second port into the chamber at one of said conduit end portions and to define a third port into the chamber at the other thereof;
   a pair of fitting means individual to said conduit end portions for fixing said end portions to the wall means in sealed relation thereto;
   a ram received in said chamber for movement therein in a direction from said second closure means toward said first closure means, the ram
      having a first end facing said first closure means, said first end bearing a conduit cutting portion disposed toward said second port and adjacent to said wall means and bearing a conduit collapsing portion disposed toward said third port,
      having a second end disposed toward said closure means, means, and
      defining a passage having a first opening through said first end of the ram and having a second opening disposed toward said first port; and
   means for motivating the ram from a first position thereof, wherein the ram is disposed between said second closure means and said conduit, toward a second position of the ram, wherein said first end thereof is disposed between said first closure means and both said second port and said third port and wherein said second opening is aligned with said second port for communication of the first port therewith through said first opening and said passage, so that as the ram moves from said first position toward said second position said cutting portion severs the conduit at said second port for subsequent alignment of said second opening therewith and said collapsing portion collapses the conduit against said wall means adjacently to said third port.

2. The valve of claim 1 wherein said collapsing portion is configured so that collapse of said conduit thereby against said wall means seals said third port from the chamber.

3. The valve of claim 1 wherein said collapsing portion is configured so that movement of the ram toward the second position thereof after said cutting portion severs the conduit wedges the conduit between the ram and said wall means so as to retain the ram in said second position.

4. The valve of claim 1 wherein said collapsing means comprises a surface diverging from the wall means in a direction in which the ram moves from the first position thereof toward the second position thereof, said surface being disposed on the ram so that, as the ram moves toward the second position thereof, said surface engages the conduit after said severing means severs the conduit and said surface then rides over the conduit so as to collapse the conduit against said wall means and seal the third port from the chamber and so as to wedge the severed conduit between said surface and said wall means and retain the ram in said second position.

5. The valve of claim 1 wherein:
   each of said conduit end portions is cylindrically tubular;
   said wall means defines at said second port and at said third port a cylindrical conduit opening, which is adjacent to the chamber and is larger in diameter than the corresponding one of said conduit end portions, for extension of the conduit end portion through the wall means;
   a pair of annular compression element means, which are individual to said conduit end portions and are externally larger in diameter than the corresponding one of said conduit openings, for disposition thereat about the corresponding conduit end portion when the end portion is extended through the opening; and each of said fitting means is for compressing the corresponding one of said compression elements to seal the corresponding one of said end portions to said wall means at the coresponding conduit opening.

6. A one-shot valve comprising:
   a tubular wall defining therein a valve chamber having opposite ends and defining a pair of bores opening through the wall into the chamber and disposed transversely oppositely thereof;
   means for closing each of the ends;
   a flexible tube extended through the bores and across the chamber, the tube having opposite end portions individually disposed in the bores;
   connector means individual to each of said end portions for connecting thereto a conduit for pressurized fluid;
   means individual to each of said end portions for fixing the end portion to the wall within the corresponding bore in pressure sealed relation to the wall;

a ram slidably received in the chamber for movement in a predetermined direction between said ends from an unactuated position wherein the ram is disposed between one of said ends and the tube and an actuated position wherein the ram is disposed between the bores, the ram having an operating end portion adjacent to the tube when the ram is in the unactuated position and the operating end portion bearing cutting means adjacent to one of said bores for severing the tube thereat as the ram moves initially from the unactuated position toward the actuated position so that a portion of the tube extends from the other of the bores toward said one bore, said tube portion remaining connected to the corresponding conduit for pressurized fluid, and crimping means adjacent to the other of said bores for bending and collapsing said tube portion against the wall to seal off said corresponding conduit and for wedging said tube portion between the crimping portion and the wall to retain the ram in the actuated position.

7. The valve of claim 6 wherein the wall is circularly cylindrical and said ram is exteriorly cylindrical and is slidably fitted within the wall and wherein said crimping means comprises a surface of the ram diverging from the wall in said predetermined direction so as to override said tube portion as the ram moves in said direction.

8. The valve of claim 7 wherein;

said connector means corresponding to said one of the bores connects the corresponding end portion of the tube to a first conduit for pressurized fluid, and said connector means corresponding to said other of the bores connects the corresponding end portion of the tube to a second conduit for pressurized fluid;

said means for closing each end of the valve chamber defines at one end thereof a passage into the chamber for connection to a third conduit for pressurized fluid; and the ram defines a port disposed therein for alignment with said one bore when the ram is in the actuated position and defines a passageway extending from said port to said one end of the valve chamber, so that when the ram is in the unactuated position, the first conduit communicates with the second port through the tube and, when the ram is in the actuated position, the first conduit communicates with the third conduit through said passageway.

9. A three-way, one-shot valve comprising:

a housing having a wall defining
a cylindrical valve chamber,
a first port opening through the wall at one end of the chamber, and
a second port and a third port disposed diametrically oppositely of the chamber and opening through the wall;

a collapsible tube extended across the chamber and having a first end portion received in said second port and an opposite second end portion received in said third port;

a pair of fitting means individually received in said second port and said third port for
releasably connecting the corresponding end portion of the tube to the wall in sealed relation thereto, and
connecting a conduit for pressurized fluid to the corresponding end portion of the tube in communicating relation therewith;

a ram received in the chamber for movement axially thereof and having an end disposed toward the first port, a first side disposed toward the second port, and a second side disposed toward the thrid port, the ram
bearing on said end of the ram a cutting member extended therefrom axially of the ram at said first side,
bearing on said second side a surface extending therealong from said end of the ram in a direction axialy of the chamber and oppositely of said one end of the chamber, said surface being spaced from the wall a greater distance at said end of the ram than remotely therefrom, and
defining a fluid passage having one opening through said first side of the ram and disposed for alignment with the second port when said end of the ram is disposed between the second port and said one end of the chamber and having another opening through said end of the ram; and means for motivating the ram from an unactuated position, wherein said cutting member is opposite the tube from said one end of the chamber, to an actuated position, wherein said one opening of the fluid passage is aligned transversely of the ram with said second port, so that, as the ram moves to the actuated position, the cutting member severs the tube adjacent to the second port and said surface collapses the tube to seal the third port from the chamber and wedges the tube between said surface and the wall to retain the ram in the actuated position wherein said fluid passage connects the first port and the second port.

10. The valve of claim 9 wherein at the second port and the third port;

the housing has a concave frustoconical surface radially outwardly of the tube and has internal screwthreads axially outwardly of the tube;
the tube is cylindrical and the corresponding end portion thereof has a flared region disposed in mating relation with the frustoconical surface; and
the corresponding fitting means includes a male flared fitting element having a frustoconical end engaging said flared region and having external screwthread means for engaging said internal screwthreads and urging the frustoconical end into compressive sealing relation with said flared region and urging said region into compressive sealing relation with the housing, so that, by unscrewing such a fitting element from the housing at the second port and at the third port, the severed tube is removable from the housing so that an unsevered such tube is insertable therein.

* * * * *

UNITED STATES PATENT AND TRADEMARK OFFICE
CERTIFICATE OF CORRECTION

PATENT NO. : 4,821,775

DATED : APR. 18, 1989

INVENTOR(S) : George E. Cooksey

It is certified that error appears in the above-identified patent and that said Letters Patent is hereby corrected as shown below:

In the first page between item "[76]" and item "[21]" insert:

-- [73] Assignee: The United States of America as represented by the Secretary of the Navy, Washington, D.C. --

Signed and Sealed this

Twenty-second Day of January, 1991

Attest:

HARRY F. MANBECK, JR.

*Attesting Officer*      *Commissioner of Patents and Trademarks*